_(12)_ United States Patent
Von Muenster et al.

(10) Patent No.: US 10,848,567 B1
(45) Date of Patent: Nov. 24, 2020

(54) REMOTE SUPPORT FOR IOT DEVICES

(71) Applicant: i3 Product Development, Inc., Sun Prairie, WI (US)

(72) Inventors: Nick L. Von Muenster, Anamosa, IA (US); James J. Grogan, Waunakee, WI (US); Ben A. Arciszewski, Madison, WI (US); Caleb P. Moore, Madison, WI (US)

(73) Assignee: Cygnus, LLC, Sun Prairie, WI (US)

( * ) Notice: Subject to any disclaimer, the term of this patent is extended or adjusted under 35 U.S.C. 154(b) by 0 days.

(21) Appl. No.: 16/699,266

(22) Filed: Nov. 29, 2019

(51) Int. Cl.
| | |
|---|---|
| *G06F 15/16* | (2006.01) |
| *H04L 29/08* | (2006.01) |
| *H04W 4/80* | (2018.01) |
| *H04W 8/00* | (2009.01) |
| *H04W 76/14* | (2018.01) |
| *H04L 29/06* | (2006.01) |
| *H04M 3/51* | (2006.01) |
| *H04M 3/523* | (2006.01) |
| *H04W 12/08* | (2009.01) |
| *H04W 88/04* | (2009.01) |

(52) U.S. Cl.
CPC ........ *H04L 67/125* (2013.01); *H04L 65/1069* (2013.01); *H04L 65/608* (2013.01); *H04L 67/025* (2013.01); *H04L 67/2823* (2013.01); *H04L 67/2871* (2013.01); *H04M 3/5191* (2013.01); *H04M 3/523* (2013.01); *H04W 4/80* (2018.02); *H04W 8/005* (2013.01); *H04W 12/0804* (2019.01); *H04W 76/14* (2018.02); *H04W 88/04* (2013.01)

(58) Field of Classification Search
CPC . H04L 67/125; H04L 65/1069; H04L 65/608; H04L 67/025; H04L 67/2823; H04L 67/2871; H04W 76/14; H04W 4/80; H04W 12/0804; H04W 8/005; H04W 88/04; H04M 3/5191; H04M 3/523
USPC .......................................................... 709/218
See application file for complete search history.

(56) References Cited

U.S. PATENT DOCUMENTS

| | | | |
|---|---|---|---|
| 7,353,016 B2 * | 4/2008 | Roundtree | .......... G06F 9/45512 455/414.1 |
| 7,483,989 B2 * | 1/2009 | Williams | ................ H04L 29/06 709/227 |

(Continued)

FOREIGN PATENT DOCUMENTS

WO      2019008572 A1      1/2019

*Primary Examiner* — Melvin H Pollack
(74) *Attorney, Agent, or Firm* — Stiennon & Stiennon

(57) ABSTRACT

A support agent uses a user interface within a web browser to support a remote internet of things (IoT) device in proximity to a user operating a smartphone having a proxy app installed thereon. The agent establishes a peer to peer connection between the smartphone proxy app and the agent user interface, such as with WebRTC. The proxy app scans for the IoT device and establishes a wireless connection between the smartphone and the IoT device. The agent by issuing instructions from the agent user interface to the smartphone proxy app is able to solicit or receive data from the IoT device, and to thereby adjust, configure, or diagnose the status of the IoT device. The proxy app may also establish video, voice or chat peer to peer communications with the agent, allowing the user to assist the agent in diagnosing the status of the IoT device.

17 Claims, 1 Drawing Sheet

(56) References Cited

U.S. PATENT DOCUMENTS

| | | | | |
|---|---|---|---|---|
| 7,853,242 B2* | 12/2010 | Lewis | | H04W 12/06 |
| | | | | 455/411 |
| 8,406,167 B2* | 3/2013 | Den Hartog | | H04L 12/2809 |
| | | | | 370/328 |
| 8,806,520 B2* | 8/2014 | Sharif-Ahmadi | | H04L 67/18 |
| | | | | 725/14 |
| 8,868,791 B2* | 10/2014 | Famolari | | H04L 69/18 |
| | | | | 709/250 |
| 9,036,529 B2* | 5/2015 | Erickson | | H04L 45/00 |
| | | | | 370/311 |
| 9,241,044 B2* | 1/2016 | Shribman | | H04L 65/4084 |
| 9,295,087 B2* | 3/2016 | Chitre | | H04W 76/25 |
| 9,350,662 B2* | 5/2016 | Shuman | | H04W 76/23 |
| 9,418,040 B2* | 8/2016 | Cordray | | H04L 41/20 |
| 9,456,297 B2* | 9/2016 | Pi-Sunyer | | H04L 67/1097 |
| 9,542,577 B2* | 1/2017 | Butler | | H04L 67/1097 |
| 9,613,011 B2* | 4/2017 | Lund | | G06F 3/0484 |
| 9,661,103 B2* | 5/2017 | Luna | | H04W 74/06 |
| 9,762,613 B2 | 9/2017 | Cherukuri et al. | | |
| 9,781,167 B2 | 10/2017 | Gaviria | | |
| 9,832,314 B2* | 11/2017 | Shanmugam | | H04L 67/2804 |
| 9,847,961 B2* | 12/2017 | Shuman | | H04W 4/70 |
| 9,866,637 B2* | 1/2018 | Doraiswamy | | H04L 41/0806 |
| 9,866,697 B2* | 1/2018 | Stepanian | | G06F 1/1698 |
| 9,912,599 B2* | 3/2018 | Bott | | H04W 4/16 |
| 9,979,606 B2* | 5/2018 | Gupta | | H04L 41/14 |
| 10,021,698 B2* | 7/2018 | Thies | | H04L 51/14 |
| 10,051,068 B2* | 8/2018 | Sharma | | H04L 67/26 |
| 10,122,709 B2* | 11/2018 | Momchilov | | H04L 63/0884 |
| 10,135,705 B2* | 11/2018 | Asenjo | | H04L 41/5032 |
| 10,149,335 B2* | 12/2018 | Gujral | | H04W 4/70 |
| 10,185,670 B2* | 1/2019 | Litichever | | G06F 9/45504 |
| 10,278,108 B2* | 4/2019 | Shaw | | H04W 36/36 |
| 10,313,857 B2 | 6/2019 | Baek et al. | | |
| 10,333,731 B2* | 6/2019 | Ebrom | | G06F 9/44505 |
| 10,362,113 B2* | 7/2019 | Bhadra | | H04W 84/18 |
| 10,374,869 B2* | 8/2019 | Jain | | H04L 41/046 |
| 10,425,418 B2* | 9/2019 | Asai | | G06F 21/31 |
| 10,430,263 B2* | 10/2019 | Polar Seminario | | |
| | | | | G06F 11/0793 |
| 10,433,286 B2* | 10/2019 | Nair | | H04W 12/06 |
| 10,455,418 B2 | 10/2019 | Bartlett et al. | | |
| 10,469,600 B2* | 11/2019 | Tsai | | H04L 67/146 |
| 10,492,102 B2* | 11/2019 | Raleigh | | H04L 69/18 |
| 10,517,021 B2* | 12/2019 | Feldman | | H04W 8/26 |
| 10,523,689 B2* | 12/2019 | Decenzo | | H04L 63/02 |
| 10,536,391 B1* | 1/2020 | Braverman | | G06F 9/4806 |
| 10,581,690 B2* | 3/2020 | Salgueiro | | H04W 4/50 |
| 10,595,187 B2* | 3/2020 | Tandon | | H04W 8/005 |
| 10,630,728 B2* | 4/2020 | Ghosh | | G06F 21/6245 |
| 10,635,715 B2* | 4/2020 | Nguyen | | H04N 21/2323 |
| 10,638,190 B2* | 4/2020 | Gonzalez | | H04N 21/6143 |
| 10,666,523 B2* | 5/2020 | Dawes | | H04L 41/22 |
| 10,693,800 B2* | 6/2020 | Jung | | H04L 47/34 |
| 10,712,738 B2* | 7/2020 | Cella | | H04L 1/1874 |
| 10,716,126 B2* | 7/2020 | Gulbay | | G06F 9/00 |
| 10,728,113 B2* | 7/2020 | Sinha | | H04L 41/5009 |
| 10,728,336 B2* | 7/2020 | Akhtar | | G05B 13/0275 |
| 10,749,876 B2* | 8/2020 | Bendersky | | G06F 21/31 |
| 10,757,757 B2* | 8/2020 | Sabella | | H04W 12/009 |
| 2012/0151006 A1* | 6/2012 | McInerney | | H04N 21/42204 |
| | | | | 709/219 |
| 2012/0324118 A1 | 12/2012 | Pfleider et al. | | |
| 2015/0026779 A1* | 1/2015 | Ilsar | | H04W 12/003 |
| | | | | 726/5 |
| 2015/0071052 A1* | 3/2015 | Hershberg | | H04W 24/04 |
| | | | | 370/216 |
| 2015/0312317 A1* | 10/2015 | Wehrman | | H04W 4/48 |
| | | | | 715/740 |
| 2015/0358777 A1* | 12/2015 | Gupta | | H04W 4/023 |
| | | | | 370/254 |
| 2016/0036908 A1* | 2/2016 | Aggarwal | | H04L 67/16 |
| | | | | 370/254 |
| 2016/0112465 A1* | 4/2016 | Hasegawa | | H04L 65/1069 |
| | | | | 709/227 |
| 2016/0294614 A1* | 10/2016 | Searle | | G06F 8/654 |
| 2016/0309221 A1* | 10/2016 | Gonzalez | | H04N 21/6582 |
| 2017/0063566 A1* | 3/2017 | Seminario | | H04L 12/2816 |
| 2017/0344703 A1* | 11/2017 | Ansari | | H04L 63/0876 |
| 2017/0366583 A1 | 12/2017 | Shannon et al. | | |
| 2017/0374157 A1* | 12/2017 | Hu | | H04L 67/142 |
| 2018/0077714 A1* | 3/2018 | Kodaypak | | H04L 67/306 |
| 2018/0092017 A1* | 3/2018 | Freda | | H04B 7/155 |
| 2018/0206166 A1* | 7/2018 | Ganesan | | H04M 7/006 |
| 2018/0343304 A1* | 11/2018 | Binder | | H04L 67/12 |
| 2018/0373399 A1* | 12/2018 | Battula | | H04W 4/16 |
| 2018/0375720 A1* | 12/2018 | Yang | | H04L 69/40 |
| 2018/0375887 A1* | 12/2018 | Dezent | | H04L 67/30 |
| 2019/0075090 A1* | 3/2019 | Entezari | | H04L 63/061 |
| 2019/0087909 A1* | 3/2019 | Scott | | G06Q 40/08 |
| 2019/0140731 A1* | 5/2019 | Mohan | | H04B 7/14 |
| 2019/0140908 A1* | 5/2019 | Ma | | H04L 41/5058 |
| 2019/0141535 A1* | 5/2019 | Morgan | | G06F 16/9558 |
| 2019/0158304 A1* | 5/2019 | Sundermeyer | | H04L 12/2818 |
| 2019/0158353 A1* | 5/2019 | Johnson | | H04L 67/125 |
| 2019/0190740 A1* | 6/2019 | Gould | | H04L 41/22 |
| 2019/0294712 A1* | 9/2019 | Haddon | | H04W 4/12 |
| 2019/0327270 A1* | 10/2019 | Vaddadi | | G06F 21/57 |
| 2019/0339688 A1* | 11/2019 | Cella | | G06K 9/6263 |
| 2019/0349426 A1* | 11/2019 | Smith | | H04W 4/08 |
| 2019/0394700 A1* | 12/2019 | Lekutai | | H04W 24/04 |
| 2020/0007414 A1* | 1/2020 | Smith | | H04L 41/5009 |
| 2020/0007615 A1* | 1/2020 | Brebner | | G06F 9/44526 |
| 2020/0012488 A1* | 1/2020 | Koval | | G06F 8/71 |
| 2020/0021481 A1* | 1/2020 | Tsigkogiannis | | H04L 67/20 |
| 2020/0021660 A1* | 1/2020 | Komatsu | | H04L 12/4641 |
| 2020/0103894 A1* | 4/2020 | Cella | | H04L 67/1097 |
| 2020/0107226 A1* | 4/2020 | Raleigh | | H04W 28/10 |
| 2020/0128114 A1* | 4/2020 | Kloberdans | | G06F 16/951 |
| 2020/0133254 A1* | 4/2020 | Cella | | G05B 23/0229 |
| 2020/0133925 A1* | 4/2020 | Tiwari | | H04L 67/1097 |
| 2020/0213360 A1* | 7/2020 | Ojha | | H04W 12/0804 |
| 2020/0279626 A1* | 9/2020 | Ansari | | H04L 63/0876 |
| 2020/0285731 A1* | 9/2020 | Thom | | G06F 21/57 |
| 2020/0285761 A1* | 9/2020 | Buck | | G06F 21/51 |
| 2020/0285977 A1* | 9/2020 | Brebner | | G06Q 50/28 |

* cited by examiner

REMOTE SUPPORT FOR IOT DEVICES

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to remote support of internet of things (IoT) devices.

In the Internet of Things (IoT) everyday objects and devices are provided with networking hardware and often sensors. These IoT devices may be for individual consumers, commercial applicability, and/or industrial applicability. Consumer IoT devices may include vehicles, home automation, wearables, and other devices and applications. Commercial applications of IoT devices may include medical devices, building automation, industrial applications, manufacturing, agricultural machinery, and others.

The IoT devices may measure particular attributes of an object or situation, generating data. The data may then be passed, for example, through a network to a particular receiving point for analysis and reporting to a user. IoT devices may be relatively low-cost and may be relatively abundant. IoT devices may have limited computational and network capabilities. IoT devices may therefore be reliant on a secondary device for configuration and connection.

One of the most difficult challenges to overcome for end-users is the connectivity of IoT devices and troubleshooting issues in the field. Most of the time, support technicians are not available due to the low cost, high scale nature of modern IoT and connected devices. Manufacturers cannot send support technicians on-site to figure out all the complex issues that might arise with connected devices including establishing a connection to the internet, diagnosing sensor issues, determining if product returns are required, making remote firmware updates and many other issues. If manufacturers cannot support their products effectively, end-users may stop using the product, may not recommend the product to peers, and may provide poor reviews online in e-commerce stores and app stores.

Conventional phone support brings the agent's expertise to the service of the end user, but there can be many factors contributing to the problem, which are not readily accessible to the support agent. For example, is the user's Wi-Fi down? The support agent will not know the SSID, or the password. The agent will not know if the internet is down. Perhaps the device must be reconfigured or its software updated. The agent can provide assistance, but will require much input from the user, and may require the user to carry out technical steps which are new and unfamiliar to the user, making for a drawn-out and unsatisfying service call.

What is needed is a system which makes it easy for end-users to establish support sessions with remote support personnel and allow those support professionals to connect, diagnose and treat the issues reliably without having to physically interact with the device.

SUMMARY OF THE INVENTION

The systems and method of this invention allows an end-user to receive support of an IoT device simply by being in proximity of the device with a mobile computing device such as a smartphone which allows support personnel to effectively support the product. In the system, a support agent is provided with a web browser with a user interface (UI) configured for the particular IoT device to be supported. The user has a smartphone on which has been installed software in the form of a downloadable app which allows the smartphone to act as a proxy. The user's smartphone is in proximity to an IoT device which is configured to allow its data to be streamed effectively through the app via BLE, Wi-Fi, or NFC other wireless communication standards. The smartphone with installed app is the proxy or middleware that gathers the data from the proprietary BLE, Wi-Fi or NFC connection on the IoT device and transports it up the web to the agent's UI in the web browser that is able to communicate with that specific device. The app does this by using a WebRTC direct connection to the web browser and has a standard transport layer in the data, video or audio channel of WebRTC communication. The app may convert raw logs and data from BLE, Wi-Fi or NFC on the device side and transport it back to the web browser. The agent's web browser sends commands to the app and the app converts the commands into BLE, Wi-Fi or NFC based commands that the specific IoT device understands.

Although the implementation of the system will vary for each different IoT device, the proxy (app) implementation may employ standard WebRTC transport mechanisms. The app serves as the authentication mechanism and the proxy for the web to talk directly to a specific IoT device.

It is an object of the present invention to provide a system and process for establishing peer to peer access between an IoT device and a UI under the control of a remote support agent.

It is another object of the present invention to provide an arrangement which permits a user with a smartphone to offer access to a nearby IoT device to a remote support agent.

Further objects, features and advantages of the invention will be apparent from the following detailed description when taken in conjunction with the accompanying drawings.

DESCRIPTION OF THE PREFERRED EMBODIMENTS

Figure 1:
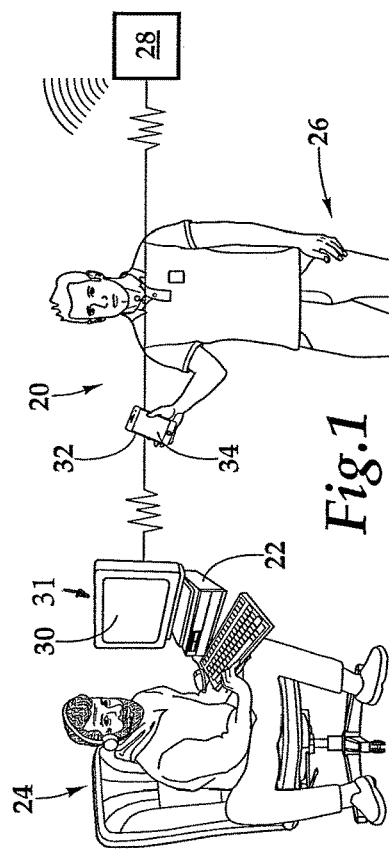
FIG. 1 is a schematic view of a support agent connection to a user with a mobile device having a proxy app installed therein and in wireless connection with an IoT device.
Figure 2:
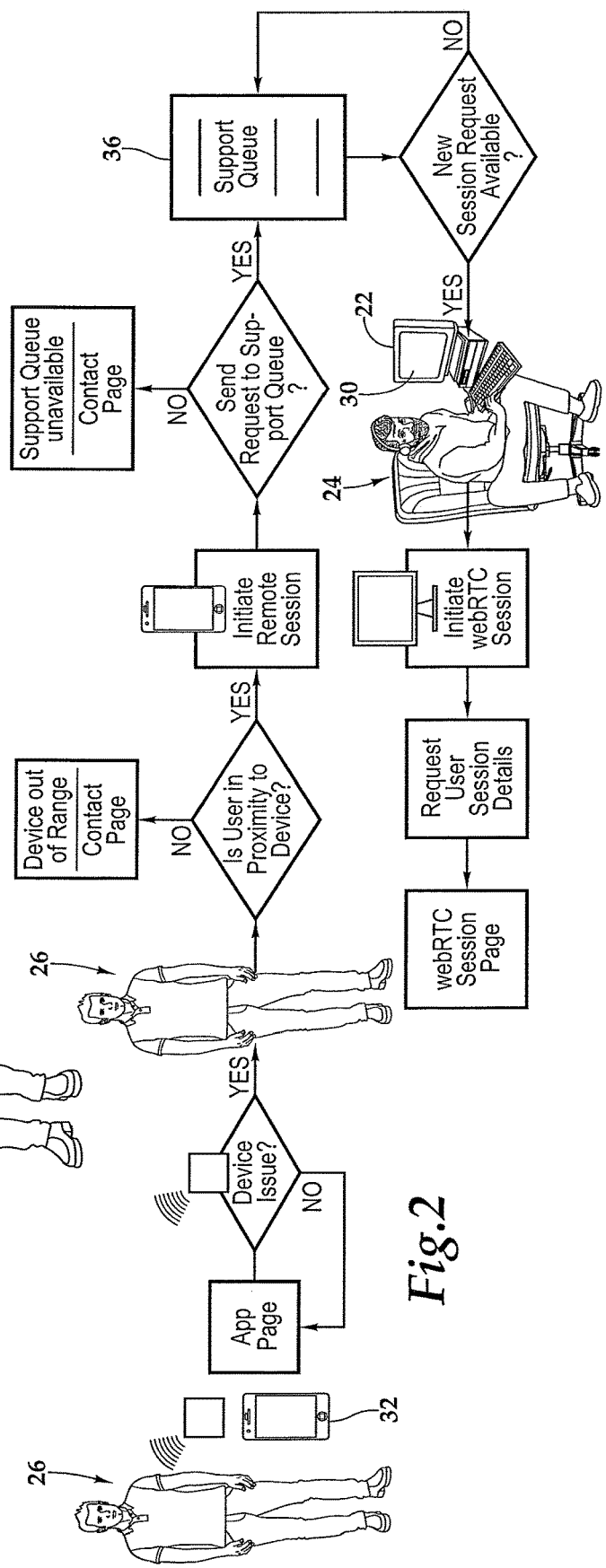
FIG. 2 is a schematic view of a workflow for use with the system and method of the invention.

Referring more particularly to FIGS. 1-2, wherein like numbers refer to similar parts, a system 20 for providing remote control and support of a physical device such as an IoT device using a proxy application is shown in FIG. 1. The system 20 includes a computer 22 under the control of a support agent user 24 who may be present at a call center or manufacturer facility which is remote from the user 26 of an IoT device 28. The computer 22 runs a web browser 30 which is connected to the Internet and which is displayed to the support agent user 24 on the computer's video display 31. The user 26 has a mobile device such as a smartphone 32 and is in physical proximity to the IoT device 28. The smartphone 32 has the ability to connect to a cellular voice and data network, and also has wireless capability enabling it to communicate with the IoT device. The IoT device 28 has a unique identifier and the ability to transfer data over a network, specifically to receive and send wireless communications to the user's smartphone 32 which is within transmission range of the IoT device.

The IoT device 28 may be a consumer product used in the home, or it may be a commercial, industrial, agricultural or other business device. The IoT device is a powered object having some form of networking hardware, a microprocessor, memory, and capability to communicate over a network (such as, but not limited to, Bluetooth, BLE (Bluetooth Low Energy), Wi-Fi, ZigBee (an IEEE 802.15.4-based specification for a suite of high-level communication protocols), Z-Wave (a mesh network using low-energy radio waves), NFC (Near Field Communication), digital radio transmission, wired connection, and other such technologies). The IoT device 28 will often have a sensor that can sense the physical word, for example, a temperature sensor, an accelerometer, a pressure sensor, etc. IoT devices will often have low compute power and do not run a real-time operating system. A real-time operating system (OS) is an operating system that processes data as it comes in without buffer delays, wherein processing time requirements including OS delay are measured in tenths of seconds or less.

The smartphone 32 is equipped with multiple mechanisms for transmitting data over a network, for example, a Bluetooth hardware component, a mobile internet component, and/or a wireless internet component. By smartphone is meant a portable device which is capable of wirelessly connecting to cellular voice networks and also to the wireless communication system of an IoT device, and which has the capability to display graphics and has the ability to download and run an application (app).

The smartphone 32 has installed on it a proxy app 34. The user 26 will typically obtain the app from an app store such as the Apple App Store or Google Play. The proxy app is software installed on the smartphone which enables the smartphone to serve as an intermediary device between the agent's computer and the IoT device. The smartphone running the app becomes a proxy. A proxy is defined as a device that is an intermediary between two devices that serves to transmit communications between two devices that do not communicate directly with one another.

The smartphone with installed app enables the two end points of the agent's browser UI and the IoT device to connect to each other. As discussed below, in most cases the proxy app will be a configured for a specific IoT device and will have a proprietary protocol or schema of data. The proxy app packages data in a standard way for transport, but the implementations on each end of communication is custom for each IoT device. The proxy app allows the agent to connect through the user's smartphone to the IoT device, and thereby adjust, configure or diagnose the status of the IoT device.

The software on the agent's computer, the proxy app, and the firmware within the IoT device are for the most part specific to each product or type of IoT device.

As indicated in the flow chart of FIG. 2, at various stages the smartphone or the agent's browser will display various pages which are screens available to the user or the agent which indicate the status of the arrangement. The use of the system 20 begins when the user 26 determines that there is some issue with the IoT device which requires the assistance of the support agent 24. The user 26 then makes a phone call to the customer support facility, or the user may initiate a remote support session with voice, video or both from within the proxy app on the smartphone 32. The user thus communicates in a way indicating that assistance with the proper functioning of the IoT device is required. The user is placed in a support queue 36 at the customer support facility, and waits in the queue for the next available agent to answer the call or accept the remote session through the app. If the support queue is not functioning or is for some reason unavailable, the user may see a screen on the smartphone with contact information and encouragement to the user to attempt to call later. If the user reaches the queue, when the agent 24 is free, the agent takes the call or remote session. If the user 26 has not initiated a remote session on the smartphone 32, the agent invites the user to do so using the proxy app. The agent 24 finds this remote session in the queue, and initiates the agent side of the support session in the web browser 30 on the agent computer 22. The agent's web browser 30 and the proxy app 34 on the smartphone negotiate a peer to peer connection, for example a WebRTC session. WebRTC is an open-source project which provides real-time communication between browsers and mobile platforms, and can permit voice, data, text, photos and video to be communicated between the two endpoints. If the user enables it, the agent may speak directly to the user, speak over video chat, use the smartphone camera to see the IoT device, or view the location of the user and the IoT device using the smartphone's GPS capabilities. The WebRTC or other peer to peer, negotiated session permits direct communication between the web browser to be initiated and maintained without the use of cloud routing wherever possible.

Once the WebRTC session is established, the agent is connected to the proxy app on the smartphone. To work with the app the agent selects in the browser 30 from a plurality of available user interfaces the particular UI for the user's IoT device type and capability. This UI is particularly arranged to display values output by the user's particular IoT device. The connection is between the smartphone 32 and the agent's web browser on the agent computer 22, but now the agent, through the UI can make use of the user's smartphone 32 to search for the IoT device 28 requiring service. Alternatively, in establishing the WebRTC session, the device can identify what type of UI is needed causing the proper UI to be displayed in the agent's browser.

The user 26 and the smartphone 32 running the proxy app 34 need to be in physical proximity of the IoT device, without this proximity, a connection cannot be established. This proximity will be within the house or business building which the user is occupying, usually within 100 yards. In many cases this proximity will be close enough that the user can reach out and touch the device, that is, within 3 feet. For security, there may be a shared secret between the proxy app on the smartphone and the IoT device. In cases where the IoT device has been already registered with the manufacturer or seller, the user will have an account which is associated with the particular IoT device, and this registration information will be maintained in a database which is accessible to the support agent. The process of establishing the connection between the smartphone and the IoT device under the control of the support agent will then involve searching the database of user registrations of IoT devices which is accessible to the agent and determining that the user has registered the IoT device. These steps provide an added layer of security, because it is not enough for the user to be in proximity to the IoT device, the IoT device must be a device registered to the user for the support session to continue.

The IoT device may be provided with a button or switch which the user activates to enable this type of proximity communication via BLE (Bluetooth Low Energy), WiFi, NFC or other wireless protocol. A user pressing a button on the IoT device to be serviced is a way to confidently ascertain that the IoT device is under the control of the user. Because the IoT device is close by the user, there is some confidence that the user is authorized to access the IoT device. This is called "Proximity Authentication".

Once the agent finds the IoT device and the wireless connection is established, the agent through the use of the proxy app on the smartphone is able to issue instructions from the UI to the smartphone proxy app to solicit or receive status data from the IoT device and can then read configuration, stream information and configure remotely the IoT device. The support agent may send commands to the IoT device from the agent computer web browser user interface, to undertake the processes needed to adjust, configure, or diagnose the status of the IoT device, i.e., updating firmware, updating device configuration, streaming device logs, assessing debug information, or configuring the device to connect to the internet.

If the agent does not find the IoT device, the agent may ask the user for assistance, for example, asking the user to move closer to the device, asking the user to turn the device on or check the battery on the device, etc. If the smartphone with proxy app is not able to connect, and the user is unable to help, it is unlikely the agent will be able to connect.

Once the connection is established between the IoT device 28 and the smartphone proxy app 34, the app will be the proxy or middleware that gathers the data from the proprietary BLE, Wi-Fi or NFC connection on the IoT device and transports it up the web to the agent's 24 UI in the web browser 30 that is able to communicate with that specific device. The app uses the WebRTC direct connection to the agent's web browser and this connection has a standard transport layer in the data, video or audio channel of WebRTC communication. The proxy app 34 converts raw logs and data from BLE, Wi-Fi or NFC on the device side and transports it back to the agent's web browser. The agent's web browser sends commands to the app 34 and the app will convert those commands into BLE, Wi-Fi or NFC based commands that the IoT device understands. The proxy app is configured to receive status data in a first format from the IoT device, and to convert the status into a second, different format which is suited to display on the agent computer web browser user interface. For example, if the IoT device is a wearable device like a heartrate monitor, the app will take a BLE heartrate measurement that comes off the IoT device in hexadecimal and will convert it to ASCII and send it up to the web where the browser will display "20 beats per minute" in the UI of the agent's browser 30. If the IoT device is an appliance, like a toaster, the app will take a packed byte array of debug data from the toaster's BLE characteristic and send it up to the browser where the browser unpacks it. In this case, the app keeps the data packed to keep the payload small because logs can get very large. If the IoT device is a complicated apparatus or mobile machinery like a tractor, the app does a translation of Controlled Area Network (CAN) data to a proprietary format and streams it up to the web browser. The web browser is customized to read this particular tractor's CAN messages that the app is transmitting.

The system provides a convenient arrangement for users to receive support for their IoT devices is an expeditious and low-cost fashion. The IoT device manufacturer seeking to implement this arrangement, needs to attend to the three components of the system, and customize the app which will run on the smartphone, the User Interface that will run on the agent's browser, and the IoT device.

Although the proxy app implementation for multiple devices uses standard WebRTC transport mechanisms, the proxy app will be customized to the data it will process from the IoT device as discussed above. The app serves as the authentication mechanism and the proxy for the web to talk directly to a specific device. Standard helper libraries and software development kits (SDKs) for firmware, app software and web UI software should be provided to developers to make each implementation easy.

Each type of IoT device is configured to allow for its data to be streamed effectively through the app via BLE, Wi-Fi, or NFC or other wireless arrangement, typically this is carried out by extra firmware installed in the device to make these sessions possible. For example, in a wearable device like a heartrate monitor, the device is configured to be able to stream debug data through its BLE connection, and location is exposed via BLE. In an appliance like a toaster, the device firmware allows for the streaming of logs via BLE, it counts its uses, stores them and allows this information to be streamed out via BLE. In an IoT device like a tractor, the tractor firmware allows for a bridge from BLE to CAN so that the app can tap into the CAN data via BLE.

On the agent's side, the web browser is configured with a UI that can handle the specific IoT device. For example, if the IoT device is a heartrate monitor, the UI displays and interacts with heartbeat data, GPS data, and visualizes location information, debug data, and other information coming from the device. If the IoT device is an appliance like a toaster, the UI displays temperature, number of uses, debug data, etc. For a complicated IoT device like a tractor, the UI will have multiple screens and reads and interacts with CAN bus information like engine temperature, hours, implement attachment status, power-take-off (PTO) speed, etc.

It should be noted that "to configure" includes updating firmware, updating device configuration, configuring the device to connect to the internet, or in other ways adjusting settings, installing software, or modifying the programming of the device to obtain a desired result. Although the smartphone has the ability to communicate over voice cellular networks, it may also have the ability to establish voice communication over Wi-Fi.

It is understood that the invention is not limited to the particular construction and arrangement of parts herein illustrated and described, but embraces all such modified forms thereof as come within the scope of the following claims.

We claim:

1. A system for facilitating the remote support by a support agent user of an internet of things (IoT) device in proximity to a remote user, comprising:
  an IoT device, having the capacity to send and receive wireless communications including data regarding the status of the IoT device;
  a smartphone having the capacity to receive the wireless communications from the IoT device, and to send wireless communications to the IoT device, and further having the capacity to communicate with a wireless network, wherein the smartphone is within 100 yards of the IoT device;
  an agent computer running a web browser which displays an agent user interface on a video display visible to the agent user, the agent user interface displaying the status data of the IoT device on the video display for observation by the agent user, wherein the agent computer is remote from the IoT device and the web browser running on the agent computer is connected to communicate with the smartphone over the wireless network; and wherein a proxy app is installed on the smartphone, the proxy app being configured to receive the status data from the IoT device and to transmit said data to the agent computer web browser for display on the agent user interface to the agent user, and wherein the web browser agent user interface takes control of the proxy app under the control of the agent user to send commands to the IoT device from the agent computer web browser agent user interface, to thereby adjust, configure, or diagnose the status of the IoT device.

2. The system of claim 1 wherein the proxy app is configured to receive status data in a first format from the IoT device, and to convert the status into a second, different format which is suited to display on the agent computer web browser agent user interface.

3. The system of claim 1 wherein the IoT device has a switch thereon which must be actuated prior to wireless communication with the smartphone with proxy app.

4. A method for allowing an agent user using a user interface within a web browser to support a remote internet of things (IoT) device in proximity to a remote user operating a smartphone having a proxy app installed thereon, the method comprising:
  establishing a peer to peer connection between the smartphone proxy app and the agent user's browser;
  under the control of the agent user using the agent user interface, causing the smartphone proxy app to scan for the IoT device and establish a wireless connection between the smartphone and the IoT device; and
  issuing instructions from the agent user interface under the control of the agent user to take control of the smartphone proxy app to send commands to the IoT device to solicit or receive status data from the IoT device, and to then adjust, configure, or diagnose the status of the IoT device.

5. The method of claim 4 wherein the step of establishing a peer to peer connection between the smartphone proxy app and the agent user's browser is carried out with webRTC.

6. The method of claim 4, wherein the step of establishing a wireless connection between the smartphone and the IoT device comprises establishing a wireless connection through Bluetooth, BLE, WiFi, NFC, or radio protocols.

7. The method of claim 4 wherein the step of establishing a peer to peer connection between the smartphone proxy app and the agent user interface is only carried out after the remote user indicates authorization for the establishment of the peer to peer connection.

8. The method of claim 4 further comprising the step of the agent user interface establishing video communication, voice communication, or location access with the smartphone.

9. The method of claim 4 wherein the step of establishing wireless connection between the smartphone and the IoT device, further comprises the steps of before establishing said connection:
  searching a database of user registrations of IoT devices which is accessible to the agent user; and
  determining that the remote user has registered the IoT device.

10. The method of claim 9 wherein the IoT device has a sensor which can sense the physical world and does not have a real-time operating system.

11. The method of claim 9 where the step of adjusting, configuring, or diagnosing the status of the IoT device, comprises updating firmware, updating device configuration, streaming device logs, assessing debug information, or configuring the device to connect to the internet.

12. The method of claim 4 wherein prior to the step of establishing a peer to peer connection between the smartphone proxy app and the agent user interface, further comprising the steps of:
  receiving a communication from the remote user indicating a desire to receive service of the IoT device;
  placing the remote user in a support queue at the customer support facility; and
  connecting the user to the agent user after a wait.

13. A method for servicing a remote internet of things (IoT) device in proximity to a remote user operating a smartphone having a proxy app installed thereon, the method comprising:
  receiving a communication from the remote user indicating that the remote user requires assistance with the proper functioning of the IoT device which is within 100 yards of the remote user;
  in response to the received communication, establishing voice communication between a support agent user and the remote user over the remote user's smartphone;
  establishing a peer to peer connection between the smartphone with proxy app and a support agent browser under the control of the support agent user, and displaying to the support agent user on the browser a user interface particularly arranged to display values output by the IoT device;
  under the control of the agent user interface, after receiving permission from the remote user, causing the smartphone with proxy app to scan for the IoT device and establish a wireless connection between the smartphone with proxy app and the IoT device; and
  issuing instructions from the support agent user interface under the control of the agent user to the smartphone proxy app to solicit or receive data from the IoT device; and
  issuing instructions from the support agent user interface under the control of the agent user to the user smartphone with proxy app which adjust or configure the IoT device under the direction of the support agent user through the support agent user interface for the proper functioning of the user's IoT device.

14. The process of claim 13 wherein the step of displaying to the support agent user on the browser the user interface, further comprises selecting said user interface from a plurality of user interfaces available to the support agent user.

15. The process of claim 13 further comprising the steps of establishing video communication, or location access between the agent user and the remote user's smartphone.

16. The method of claim 13 wherein the step of establishing a peer to peer connection between the smartphone proxy app and the agent user browser is carried out with webRTC.

17. The method of claim 4 further comprising the steps of the remote user obtaining the proxy app from an app store and the app is installed onto the smartphone prior to establishing a peer to peer connection between the smartphone proxy app and the agent user's browser.

* * * * *